(12) United States Patent
Wyers

(10) Patent No.: US 10,966,478 B2
(45) Date of Patent: Apr. 6, 2021

(54) APPARATUS FOR CLEANING A HELMET

(71) Applicant: Ryan Wyers, Edmonton (CA)

(72) Inventor: Ryan Wyers, Edmonton (CA)

( * ) Notice: Subject to any disclaimer, the term of this patent is extended or adjusted under 35 U.S.C. 154(b) by 155 days.

(21) Appl. No.: 16/170,376

(22) Filed: Oct. 25, 2018

(65) Prior Publication Data
US 2019/0127006 A1 May 2, 2019

(30) Foreign Application Priority Data
Oct. 31, 2017 (CA) .................................. CA 2984278

(51) Int. Cl.
| | | |
|---|---|---|
| A42B 3/04 | (2006.01) | |
| B62J 11/00 | (2020.01) | |
| B08B 1/00 | (2006.01) | |
| F16B 1/00 | (2006.01) | |

(52) U.S. Cl.
CPC ............ *A42B 3/0406* (2013.01); *B08B 1/006* (2013.01); *B62J 11/00* (2013.01); *F16B 1/00* (2013.01); *F16B 2001/0035* (2013.01)

(58) Field of Classification Search
CPC ........... A42B 3/26; A42B 3/04; A42B 3/0406; B65D 2313/04; B65D 2251/0003; B65D 51/242; A47L 13/16; A47L 13/51; A46B 9/065; B62J 11/00; B08B 1/006
USPC ................. 206/818, 361, 350; 224/413, 562; 220/483
See application file for complete search history.

(56) References Cited

U.S. PATENT DOCUMENTS

| | | | | |
|---|---|---|---|---|
| 8,763,616 | B2 * | 7/2014 | Koptis ................. | A46B 11/001 |
| | | | | 134/184 |
| 2004/0205919 | A1 * | 10/2004 | Sims ....................... | A47L 13/16 |
| | | | | 15/209.1 |
| 2018/0056708 | A1 * | 3/2018 | Rogers ................ | B43L 19/0018 |
| 2018/0056710 | A1 * | 3/2018 | Boettcher ............... | B43L 21/04 |

FOREIGN PATENT DOCUMENTS

AU     2010100909     * 10/2010  ............... A43B 3/26

OTHER PUBLICATIONS

Computer generated English translation of DE 202005019143, Baas Bike Parts, Apr. 2006. (Year: 2006).*
Derwent publication DE 202005019143, Baas Bike Parts, Apr. 2006. (Year: 2006).*

* cited by examiner

*Primary Examiner* — Laura C Guidotti
(74) *Attorney, Agent, or Firm* — Davis & Bujold PLLC; Michael J. Bujold

(57) ABSTRACT

An apparatus for cleaning a helmet has a container with a hollow interior, a lid and a base. The lid is detachable from the base. The base has a body and a removable bottom panel. The body of the base has a shoulder and the removable bottom panel has a lip that rests on the shoulder of the body of the base. A magnet is provided for attaching the container to a ferromagnetic surface and a cleaning device is positioned within the container.

10 Claims, 5 Drawing Sheets

APPARATUS FOR CLEANING A HELMET

FIELD OF THE DISCLOSURE

The present application relates generally to an apparatus for cleaning a helmet. More specifically, it relates to cleaning the visor of a helmet.

BACKGROUND

This section provides background information to facilitate a better understanding of the various aspects of the invention. It should be understood that the statements in this section of this document are to be read in this light, and not as admissions of prior art.

Automobile drivers often clean their windshields while on the road. It is common, particularly in the summer months due to bugs, for a driver to need to clean their windscreen several times in a single trip to maintain good visibility. The windshield on a motorcycle is much smaller and generally does not prevent bugs and other debris from contacting a motorcyclist's visor. Many motorcyclists refrain from using a glove to wipe away this debris as it is then transferred to their bikes. Using a glove can also result in a smear across the visor which can make it even more difficult to see. Similar issues are seen for users of all-terrain vehicles and other recreational vehicles.

BRIEF SUMMARY

There is provided an apparatus for cleaning a helmet. The apparatus has a container with a hollow interior, a lid and a base. The lid is detachable from the base. A magnet is provided for attaching the container to a ferromagnetic surface. A cleaning device is positioned within the container.

In one embodiment, a fabric pad is provided on a bottom surface of the base. The fabric pad is designed to prevent damage such as scratching to a motorcycle when the container is magnetically attached to the motorcycle. A soft fabric that is less likely to cause a scratch, such as a microfiber fabric, is preferred, however it will be understood that other types of fabric may also be used. It may also be beneficial for the fabric pad to be removable to allow for cleaning or replacing of the fabric pad as needed.

In one embodiment, the lid and the base have corresponding threads to allow for attachment and detachment from each other.

In one embodiment, the cleaning device is removable from the container. This allows for replacement of cleaning devices as they become dirty through use. A sponge, sized to fit within the container, may be used.

In one embodiment, the lid of the container has an inner wall that is sized to hold the cleaning device. When the container is opened, a user can expect to find the cleaning device in the same location every time. When a cleaning device is fitted within the inner wall, the user can utilize the lid as a handle, allowing them to utilize the sponge without ever having to touch the sponge. This can help prevent the user's hands or gloves from becoming dirty through contact with the cleaning device. One method of maintaining the cleaning device in position within the inner wall is to utilize friction. The cleaning device may be friction fit into the inner wall.

In one embodiment, the base of the container has a body and a removable bottom panel. The body of the base has a shoulder and the removable bottom panel has a lip that rests on the shoulder of the body of the base. To secure the removable bottom panel within the body, a groove above the shoulder for positioning a clamp may be provided. This may be used to hold a removable fabric pad in position by clamping the fabric pad between the shoulder of the base and the lip of the removable bottom panel.

There is also provided an apparatus for cleaning a helmet. The apparatus has a container with a hollow interior, a lid and a base. The lid is detachable from the base. The base has a body and a removable bottom panel. The body of the base has a shoulder and the removable bottom panel has a lip that rests on the shoulder of the body of the base. A magnet is provided for attaching the container to a ferromagnetic surface. A cleaning device is positioned within the container.

In one embodiment, a fabric pad is provided on a bottom surface of the base. The fabric pad is designed to prevent damage such as scratching to a motorcycle when the container is magnetically attached to the motorcycle. A soft fabric that is less likely to cause a scratch, such as a microfiber fabric, is preferred, however it will be understood that other types of fabric may also be used. It may also be beneficial for the fabric pad to be removable to allow for cleaning or replacing of the fabric pad as needed.

In one embodiment, the lid and the base have corresponding threads to allow for attachment and detachment from each other.

In one embodiment, the cleaning device is removable from the container. This allows for replacement of cleaning devices as they become dirty through use. A sponge, sized to fit within the container, may be used.

In one embodiment, the lid of the container has an inner wall that is sized to hold the cleaning device. When the container is opened, a user can expect to find the cleaning device in the same location every time. When a cleaning device is fitted within the inner wall, the user can utilize the lid as a handle, allowing them to utilize the sponge without ever having to touch the sponge. This can help prevent the user's hands or gloves from becoming dirty through contact with the cleaning device. One method of maintaining the cleaning device in position within the inner wall is to utilize friction. The cleaning device may be friction fit into the inner wall.

In one embodiment, to secure the removable bottom panel within the body, a groove above the shoulder for positioning a clamp may be provided. This may be used to hold a removable fabric pad in position by clamping the fabric pad between the shoulder of the base and the lip of the removable bottom panel.

BRIEF DESCRIPTION OF THE DRAWINGS

These and other features will become more apparent from the following description in which references are made to the following drawings, in which numerical references denote like parts. The drawings are for the purpose of illustration only and are not intended to in any way limit the scope of the invention to the particular embodiments shown.

DETAILED DESCRIPTION OF THE PREFERRED EMBODIMENTS

Figure 1:
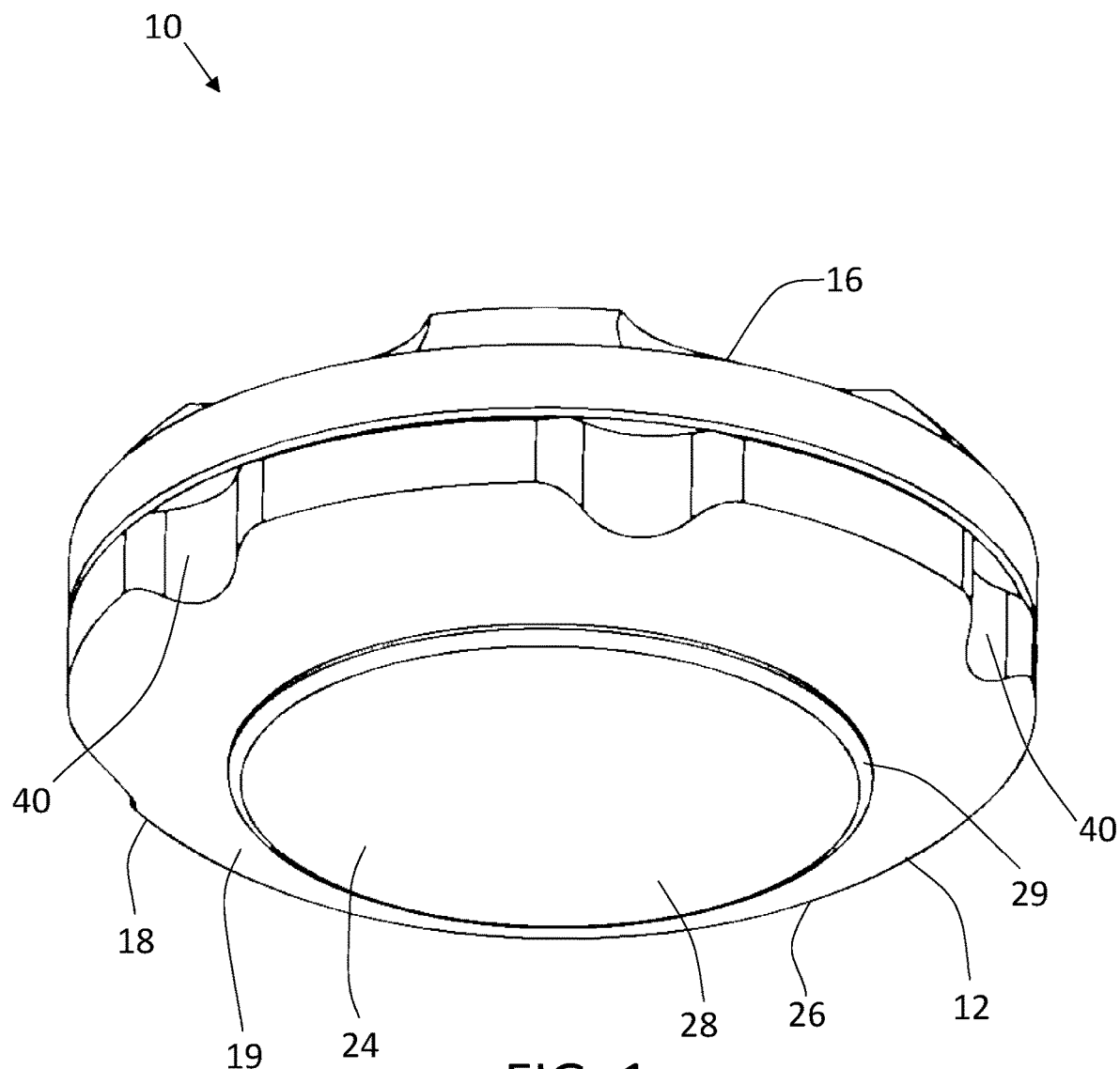
FIG. 1 is a bottom perspective view of the apparatus for cleaning a helmet.

An apparatus for cleaning a helmet, generally identified by reference numeral 10, will now be described with reference to FIG. 1 through FIG. 7.

Figure 2:
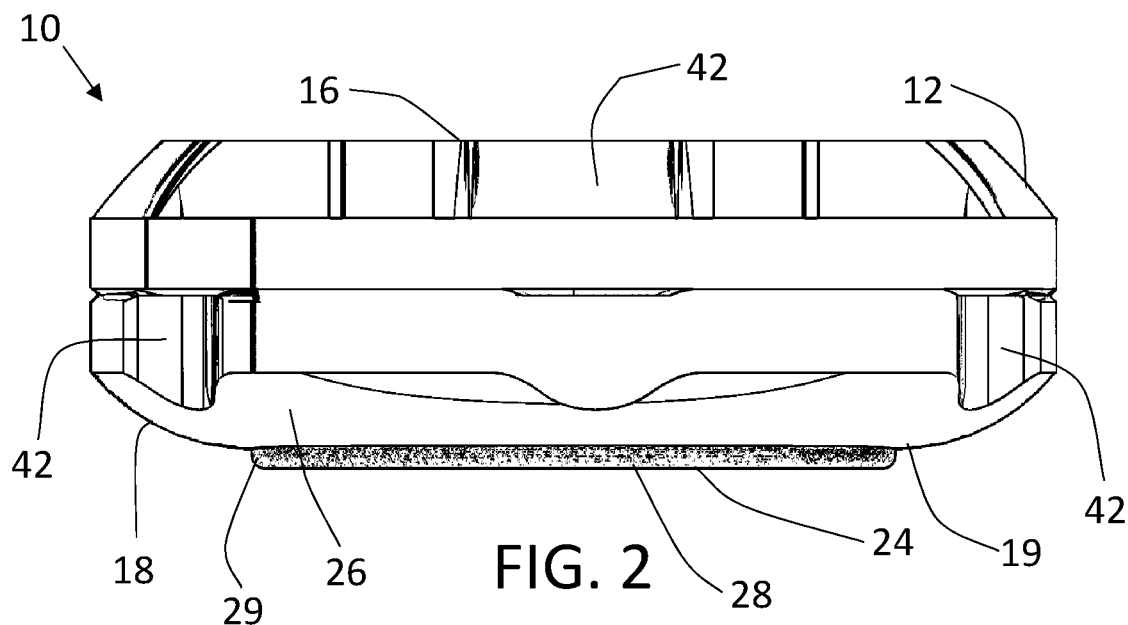
FIG. 2 is a side elevation view of the apparatus for cleaning a helmet shown in FIG. 1.
Figure 5:
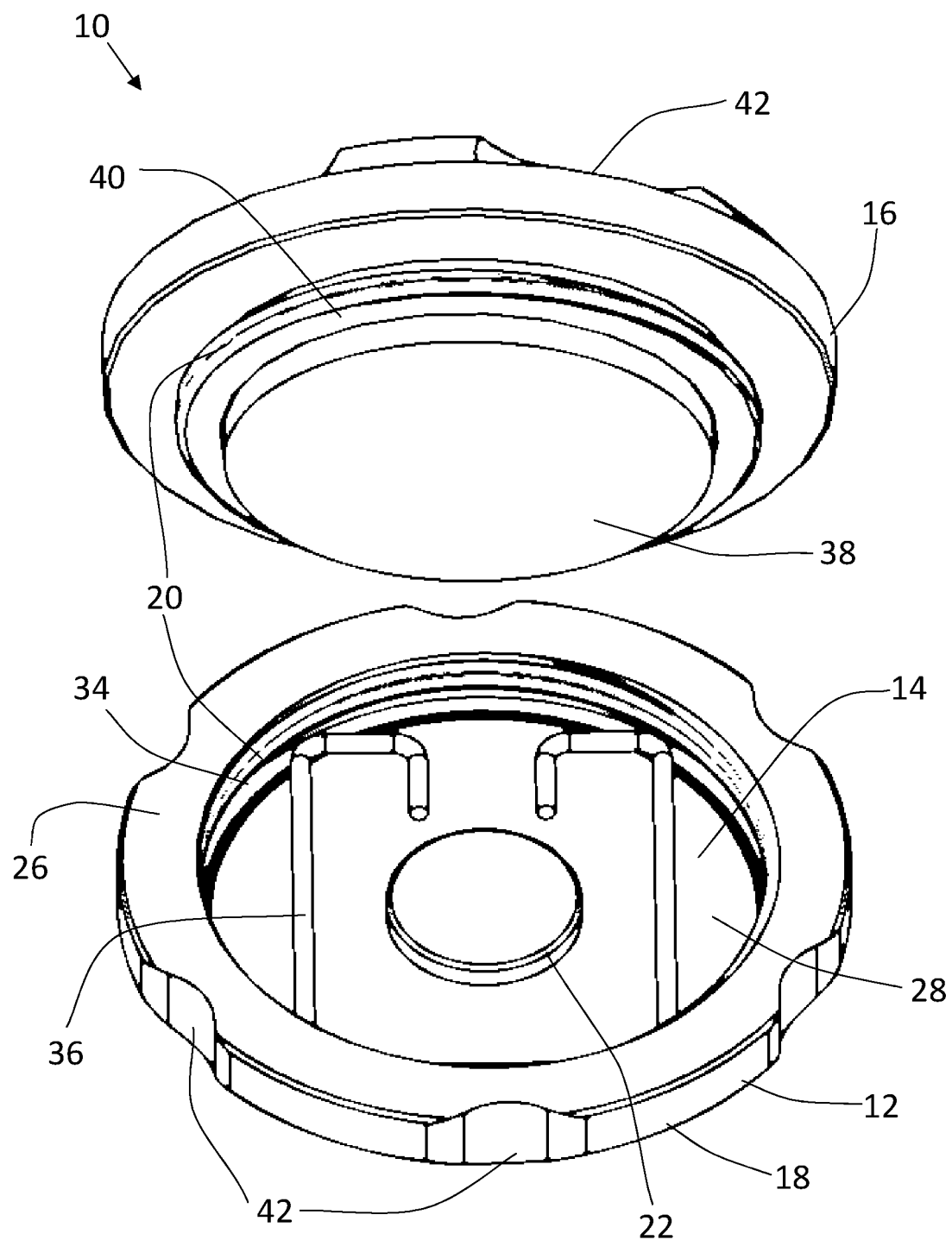
FIG. 5 is a perspective view of the apparatus shown in FIG. 1 in an open orientation.
Figure 6:
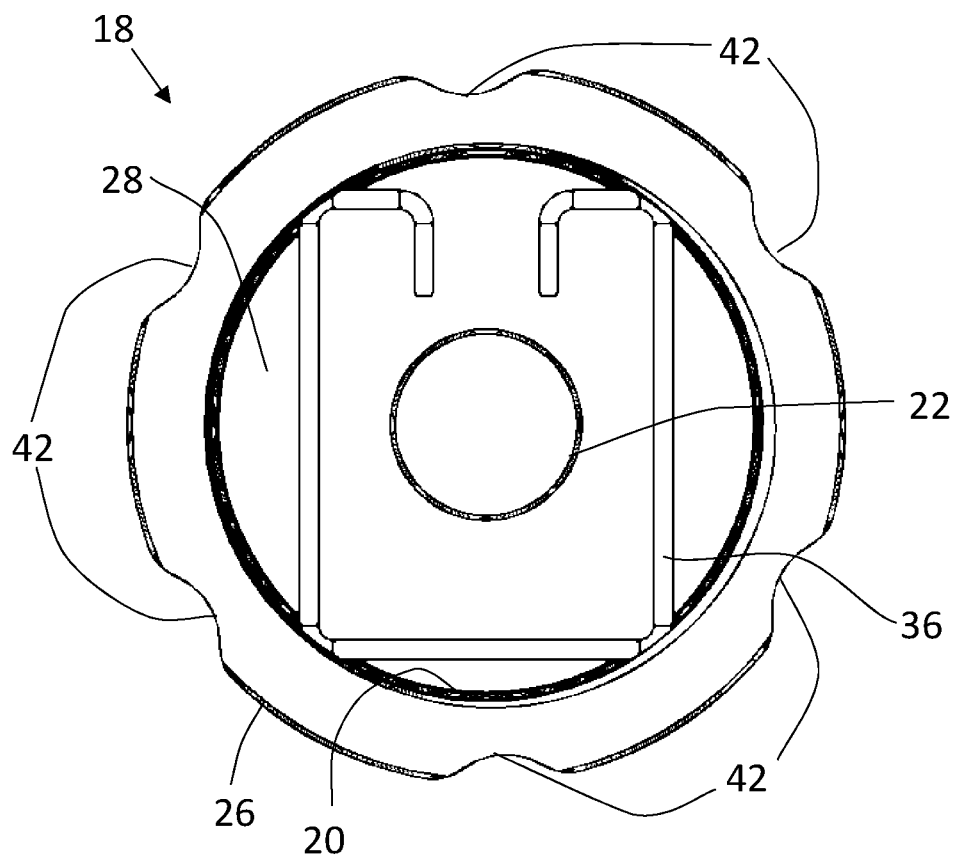
FIG. 6 is a top plan view of the bottom of the apparatus.
Figure 7:
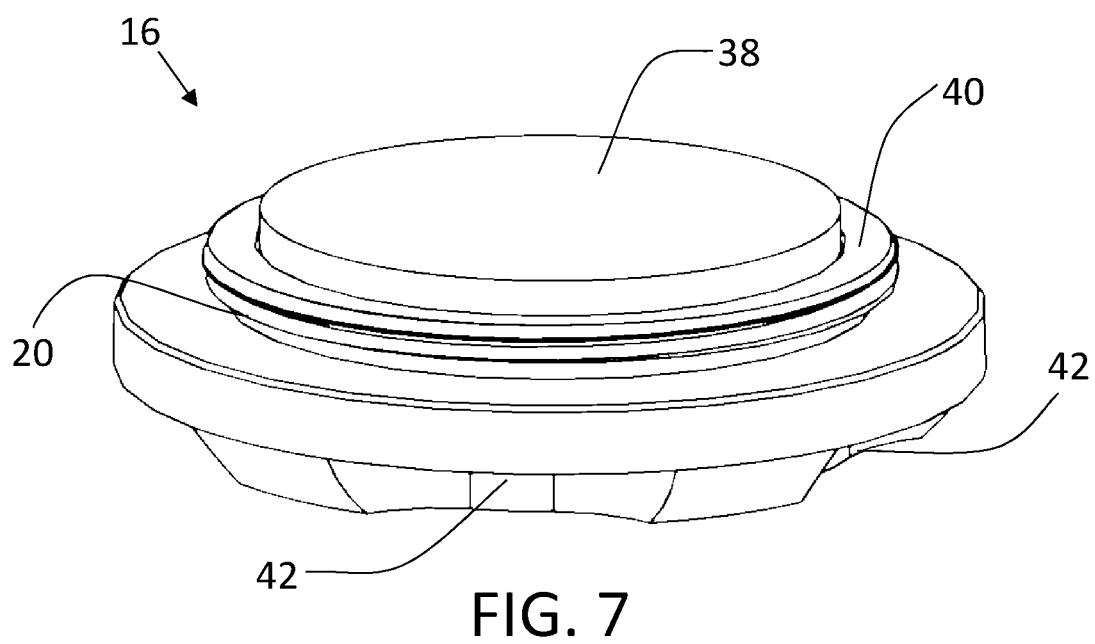
FIG. 7 is a perspective view of the lid of the apparatus.

Referring to FIG. 5, an apparatus for cleaning a helmet 10 has a container 12 with a hollow interior 14, a lid 16 and a base 18. Lid 16 is detachable from base 18. In the embodiment shown, lid 16 and base 18 have corresponding threads 20 to allow for attachment and detachment from each other. A person of skill will understand that lid 16 and base 18 may be attachable or detachable from each other in any way known in the art. Referring to FIG. 6, a magnet 22 is provided for attaching container 12 to a ferromagnetic surface, not shown. Ferromagnetic surface may be a motorcycle body, all-terrain vehicle body, recreational vehicle body or any other surface that container 12 may be attached to with the use of magnet 22. Referring to FIG. 5, in the embodiment shown, magnet 22 is positioned within base 18 of container 12, however it will be understood by a person skilled in the art that magnet 22 may be secured to an exterior of container 12. Referring to FIG. 2, to prevent damage, such as scratches, on the ferromagnetic surface to which container 12 is connected, a fabric pad 24 may be provided on a bottom surface 19 of base 18. Preferably, fabric pad 24 is made of a microfiber product that is unlikely to cause scratching to a surface. Fabric pad 24 may be removable to allow for the replacement of dirty or damaged fabric.

Figure 4:
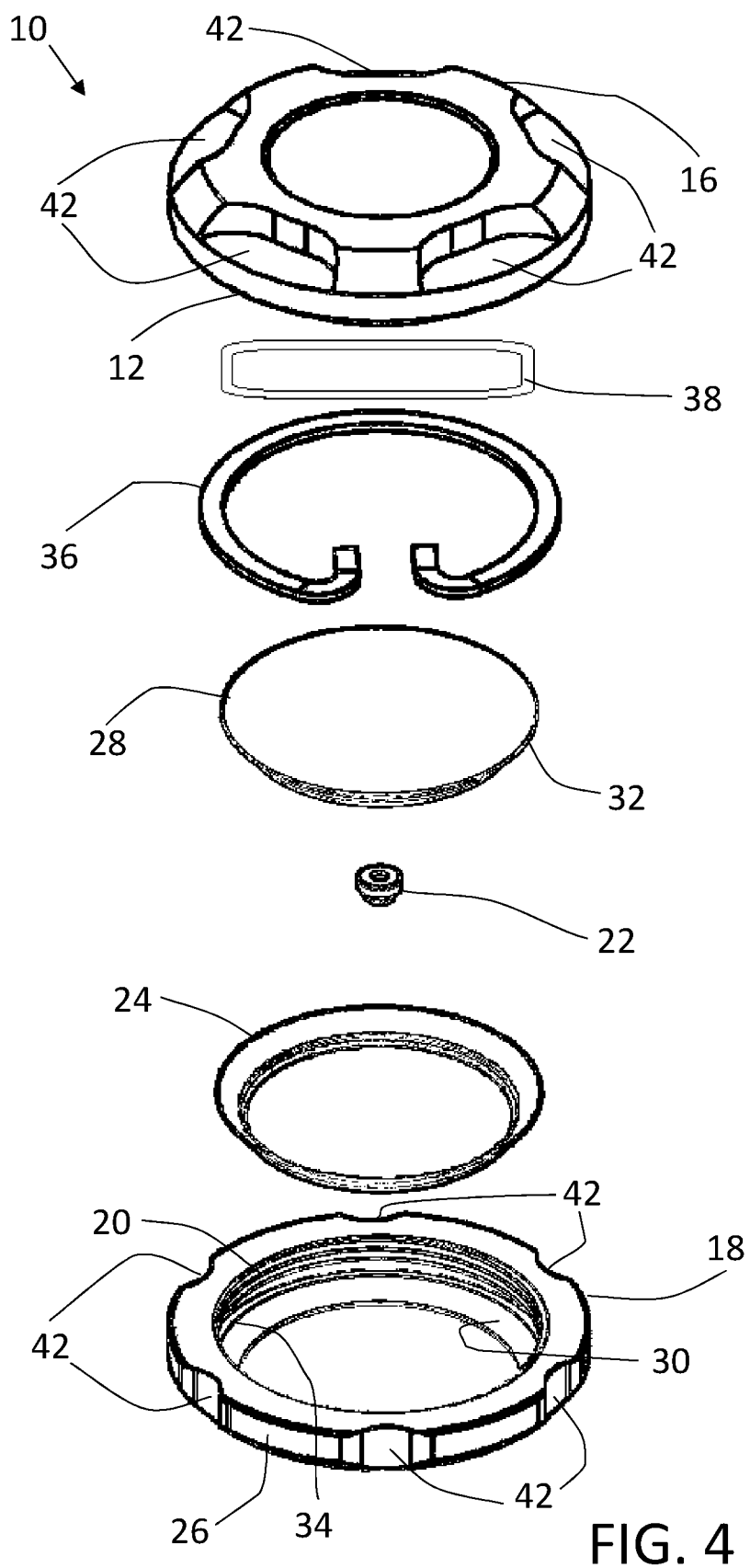
FIG. 4 is an exploded view of the apparatus for cleaning a helmet shown in FIG. 1.

Referring to FIG. 4, base 18 of container 12 has a body 26 and a removable bottom panel 28. Body 26 of base 18 has a shoulder 30 and removable bottom panel 28 has a lip 32 that rests on shoulder 30 of body 26 of base 18. Fabric pad 24 may be held in position on bottom surface 19 of base 18 by clamping fabric pad 24 between shoulder 30 of body 26 and lip 32 of removable bottom panel 28. Body 26 of base 18 has a groove 34 above shoulder 30 for positioning a clamp 36 to hold removable bottom panel 28 in position within base 18. It may be beneficial for fabric pad 24 to have stitching around its edge to help prevent it from shifting or falling out while held in place between body 26 and removable bottom panel 28. Referring to FIG. 2, edge 29 of bottom panel 28 is curved to avoid contact with the ferromagnetic surface, such as a motorcycle body, to prevent damage when container 12 is moved or slid along the surface.

Figure 3:
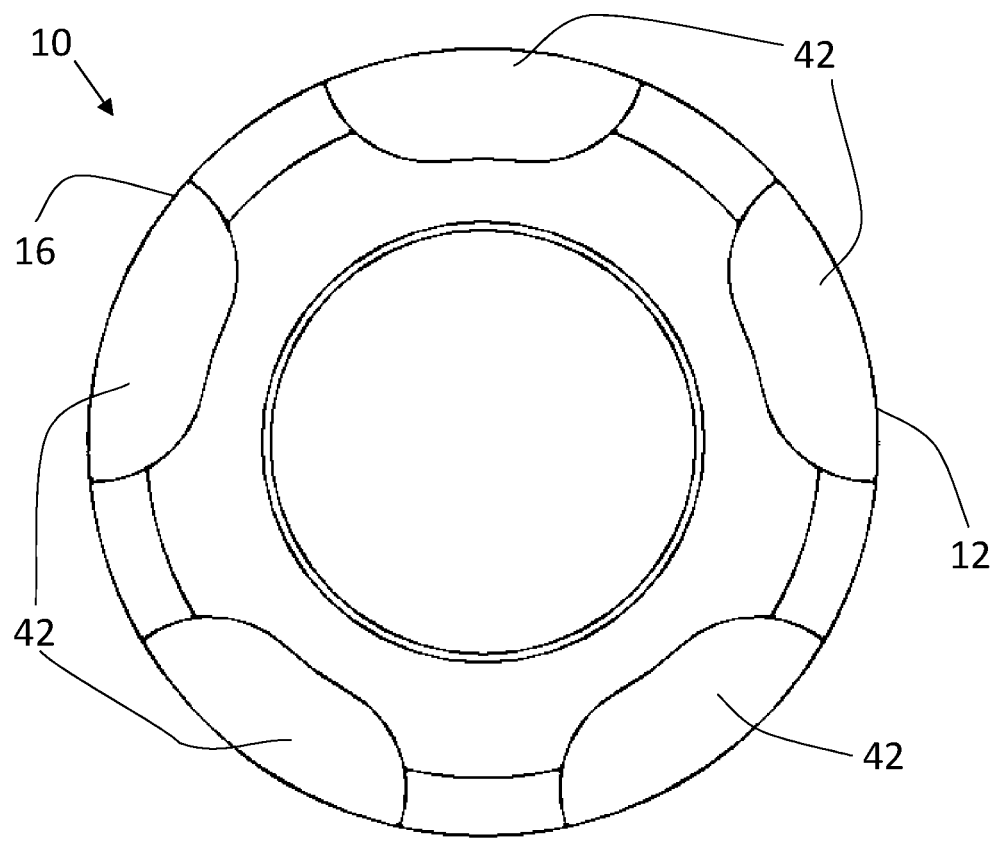
FIG. 3 is a top plan view of the apparatus for cleaning a helmet shown in FIG. 1.

Referring to FIG. 4, a cleaning device 38 is positioned within container 12. When lid 16 is detached from base 18, a user will have access to cleaning device 38. In the embodiment shown, cleaning device 38 is a sponge, however it will be understood by a person skilled in the art that different types of cleaning devices such as wipes or any other cleaning device known in the art. In the embodiment shown in FIG. 5 and FIG. 7, lid 16 of container 12 has an inner wall 40 that is sized to hold cleaning device 38. Cleaning device 38 may be held within inner wall 40 through friction. When cleaning device 38 is held within inner wall 40, lid 16 may be used as a handle for the user allowing them to use cleaning device 38 without making direct contact with cleaning device 38. In the embodiment shown, corresponding threads 20 are positioned on inner wall 40. As can be seen in FIG. 1 through 3, lid 12 has finger holds 42 that allow a user to grip lid 12. Referring to FIG. 6, base 18 has finger holds 42 to allow a user to grip base 18 when detaching lid 12 from base 18.

In the embodiments shown, container 12 is substantially cylindrical and shaped to resemble a gas tank lid. However, it will be understood by a person skilled in the art that container 12 may be any shape and should not be limited to the embodiment shown in the accompanying drawings.

Any use herein of any terms describing an interaction between elements is not meant to limit the interaction to direct interaction between the subject elements, and may also include indirect interaction between the elements such as through secondary or intermediary structure unless specifically stated otherwise.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent that changes may be made to the illustrative embodiments, while falling within the scope of the invention. As such, the scope of the following claims should not be limited by the preferred embodiments set forth in the examples and drawings described above, but should be given the broadest interpretation consistent with the description as a whole.

What is claimed is:

1. An apparatus for cleaning a helmet, comprising:
   a container having a hollow interior, a lid and a base, the lid being detachable from the base;
   the base having a body and a removable bottom panel, the body of the base having a shoulder and the removable bottom panel having a lip that rests on the shoulder of the body of the base;
   a magnet for attaching the container to a ferromagnetic surface; and
   a cleaning device being positioned within the container; and wherein the lid of the container has an inner wall sized to hold the cleaning device, and the cleaning device is held in position within the inner wall by friction.

2. The apparatus of claim 1 wherein a fabric pad is provided on a bottom surface of the base.

3. The apparatus of claim 2 wherein the fabric pad is made of a microfiber.

4. The apparatus of claim 2 wherein the fabric pad is removable.

5. The apparatus of claim 1 wherein the cleaning device is removable.

6. The apparatus of claim 1 wherein the cleaning device is a sponge.

7. The apparatus of claim 1 wherein the body of the base has a groove above the shoulder for positioning a clamp to hold the removable bottom panel in position.

8. An apparatus for cleaning a helmet, comprising:
   a container having a hollow interior, a lid and a base, the lid being detachable from the base;
   the base having a body and a removable bottom panel, the body of the base having a shoulder and the removable bottom panel having a lip that rests on the shoulder of the body of the base;
   a magnet for attaching the container to a ferromagnetic surface; and
   wherein the lid and the base have corresponding threads to allow for attachment and detachment from each other.

9. The apparatus of claim 8 wherein the lid of the container has an inner wall sized to hold the cleaning device.

10. The apparatus of claim 9 wherein the cleaning device is held in position within the inner wall by friction.

\* \* \* \* \*